Sept. 29, 1970                E. B. WAGNER                3,530,665
                    WATER INJECTOR FOR ENGINE EXHAUST
                         Filed Aug. 26, 1968
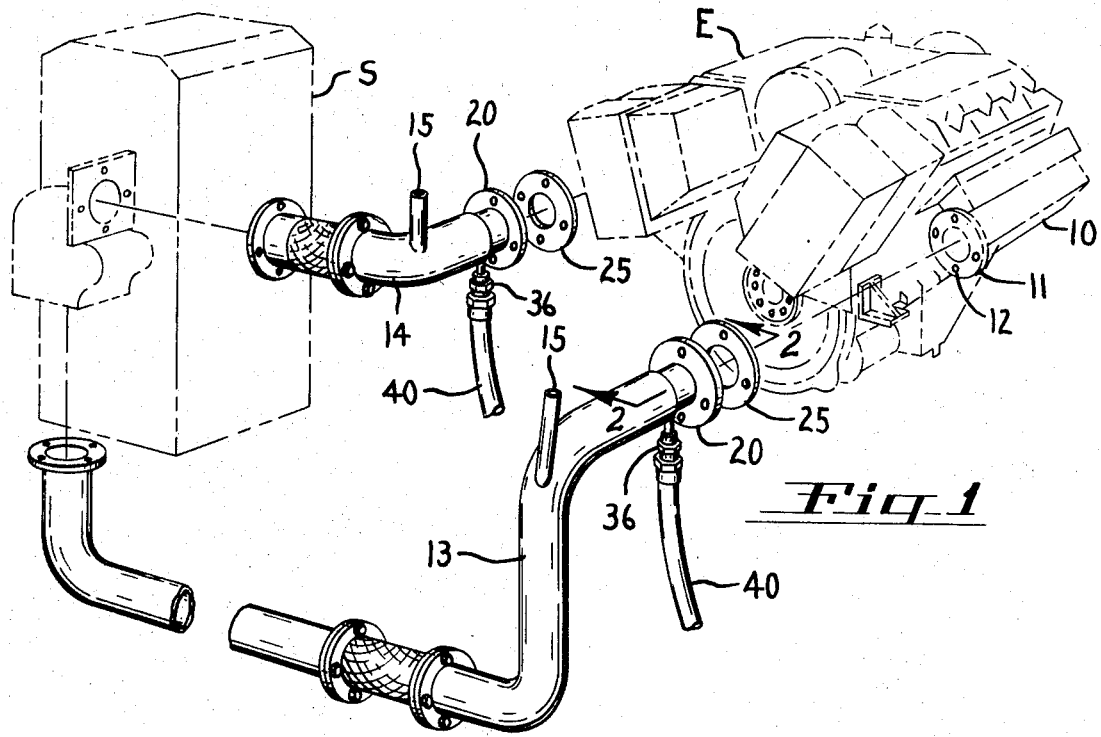
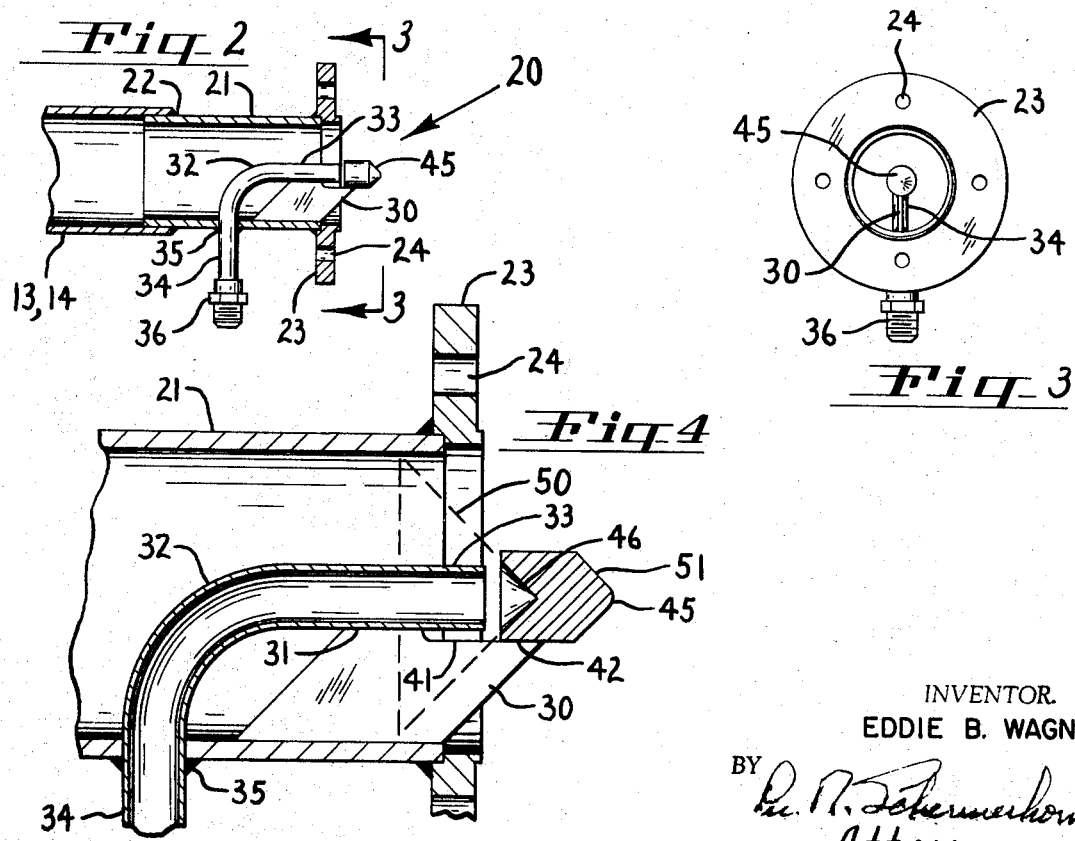
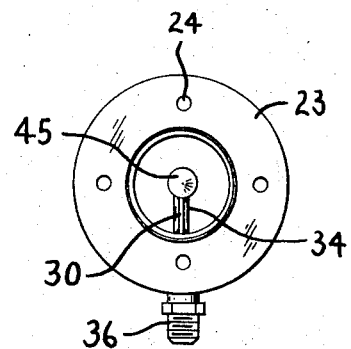
INVENTOR.
EDDIE B. WAGNER
BY
Attorney United States Patent Office 3,530,665
Patented Sept. 29, 1970

3,530,665
WATER INJECTOR FOR ENGINE EXHAUST
Eddie B. Wagner, Portland, Oreg., assignor to Wagner Mining Scoop, Inc., Portland, Oreg., a corporation of Oregon
Filed Aug. 26, 1968, Ser. No. 755,161
Int. Cl. F01n 3/04
U.S. Cl. 60—30                    6 Claims

ABSTRACT OF THE DISCLOSURE

The device is incorporated in a flanged fitting for connection between the engine exhaust manifold and exhaust pipe without requiring any modification of existing parts. An axial water tube directs its stream into a conical deflector which forms a spray to cool and wash the exhaust gases. The deflector shields the nozzle end of the water tube so that the nozzle does not become obstructed by deposits from the exhaust gases.

BACKGROUND OF THE INVENTION

This invention relates to a water injector for cooling and washing the hot exhaust gases of an internal combustion engine. The invention is not limited to any particular type of engine or exhaust system but it is of particular advantage in the engines of mining equipment used under ground where it is desired to prevent the exhaust pipes from reaching a dangerously high temperature and to reduce the exhaust emissions discharged into the air which must be breathed by workmen.

Engine exhaust pipes must be kept below a prescribed temperature to prevent the ignition of explosive gases sometimes present in mines. Also, since the exhaust gases are discharged into the atmosphere where men are working, it is necessary to remove as much as possible of the harmful products of combustion in order to reduce the load on the mine ventilation equipment.

Devices heretofore proposed for such purposes have been rather elaborate and expensive, involving extensive modification of the exhaust system. Another objection is that they have been made with a plurality of small orifices which quickly become clogged and inoperative by deposits from the exhaust gases.

SUMMARY OF THE INVENTION

The present injector is made as a simple flange fitting which is interposed between the exhaust manifold of the engine and the exhaust pipe. The fitting contains a water injector tube with a single nozzle opening and a conical deflector which forms a conical spray curtain across the path of the exhaust gases. Some of the water is vaporized, reducing the temperature of the gas and the exhaust pipe to a safe value, the unvaporized water washing smoke and other solid particles out of the gas stream. The deflector is arranged to shield the nozzle so that the nozzle does not become clogged by material in the gas stream.

Such exhaust systems also preferably include a water scrubber wherein the exhaust gases are further washed in a water bath and cleaned by an arrangement or baffles to remove remaining solids. The excess water from the injector is carried along with the exhaust gas to maintain a supply of water in the scrubber. The present injector is not limited, however, to exhaust systems having a scrubber.

Objects of the invention are, therefore, to provide an improved water injector for the exhaust system of an internal combustion engine, to provide an injector of simple and inexpensive construction which is trouble free in operation, to provide an injector spray arrangement which is free of small orifices that have a tendency to become clogged, to provide an injector having a single nozzle opening, to provide a water injector which does not require extensive modification of an existing exhaust system, and to provide a water injector incorporated in a simple flanged fitting which may be connected between the exhaust manifold and exhaust pipe on conventional types of engines.

Additional objects and advantages will become apparent and the invention will be better understood with reference to the following detailed description of the preferred embodiment illustrated in the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is an exploded view in perspective showing a pair of water injectors embodying the principles of the invention installed in the exhaust system of an internal combustion engine;

FIG. 2 is a view on the line 2—2 in FIG. 1;

FIG. 3 is a view on the line 3—3 in FIG. 2; and

FIG. 4 is an enlarged view similar to FIG. 2 but showing the water tube and deflector in section.

DESCRIPTION OF THE PREFERRED EMBODIMENT

The V-type engine E has a pair of water-jacketed exhaust manifolds at 10 on opposite sides of the engine, one of which appears in FIG. 1. Each manifold 10 is equipped with a flange 11 having bolt holes 12 for connection with an exhaust pipe. One exhaust pipe is indicated at 13 and the other at 14.

The two exhaust pipes preferably connect with a scrubber S which may be of conventional construction. The scrubber contains a water reservoir, a plurality of baffles and a discharge opening, not shown. The exhaust gases are directed either against the surface of the water or are caused to pass through the water. The baffles convey the exhaust gases in a circuitous path to the discharge opening after having been cooled and washed. The details of construction of the scrubber are immaterial to the present invention. Each exhaust pipe is also equipped wtih a thermocouple well 15 containing a thermocouple to monitor the exhaust temperature. Such thermocouples may be incorporated in a safety control system arranged to stop the engnie in case of overheating.

According to the present invention, each exhaust pipe 13 and 14 includes a water injection unit 20. Unit 20 comprises an exhaust tube 21 which fits inside the exhaust pipe and is welded thereto at 22. The exhaust pipes are conventionally equipped with flanges to mate with the manifold flanges 11. To install the present injector, the exhaust pipe flanges are removed and the tubes 21 installed as described. In removing the exhaust pipe flanges, a few inches of the exhaust pipe may also be cut off corresponding to the exposed length of tube 21 in FIG. 2 so that the positions of the exhaust pipes are not altered in relation to the engine.

The outer end of tube 21 is welded to flange 23 having bolt holes 24 to register with the bolt hole 12 in the manifold flange 11. The two flanges 11 and 23 are bolted together on opposite sides of a gasket 25.

Welded inside of tube 21 is a water tube and deflector support comprising a flat plate strut 30 in radial position. An inner end portion of plate 30 is welded at 31 to an L-shaped water tube 32. Tube 32 has a nozzle end 33 in axial position in tube 21 and directed upstream in relation to the flow of exhaust gas. Tube 32 has a radial inlet portion 34 wich passes through a hole in tube 21 and is welded thereto at 35. The external end of tube 32 is equipped with a fitting 36 for connection to a water supply tube 40. Water is supplied through tube 40 by an engine-driven pump connected with a water tank.

The axially projected outer end portion of plate 30 is cut down at 41 and welded at 42 to a deflector 45 on the axis of both tubes 21 and 32. Deflector 45 contains a concave conical deflector surface 46 closely adjacent the end of tube 32.

A solid stream of water issuing from tube 32 is deflected by surface 46 in a conical spray pattern as indicated at 50, forming a spray curtain through which the exhaust gas must pass. The outside diameter of deflector 45 is slightly larger than tube 32 and, since the deflector is positioned close to the end of tube 32, the deflector provides an effective shield to prevent exhaust material from blowing into tube 32. The engine may be operated at times when water is not supplied to the injection tube to keep it open and clean. The water deflecting surface 46 is also shielded from the gas flow, by reason of its being on the downstream side of the deflector, whereby the deflecting surface does not accumulate carbon deposits and the like which would impair its effectiveness. The deflector has a streamlined convex conical nose 51 to minimize its obstruction to the flow of exhaust gases.

As previously mentioned, some of the water in spray 50 is vaporized, reducing the temperature of the exhaust gases and exhaust pipes 13 and 14. A considerable amount of solids is washd out of the exhaust gases by this spray and carried along with the excess water and deposited in scrubber S. The scrubber is cleaned from time to time to remove such solids.

Nozzle 33 is preferably approximately in the plane of flange 23 and deflector 45 projects forward from the flange whereby the deflector is positioned in the exhaust manifold when the unit 20 is connected to the manifold. This causes the spray 50 to operate immediately at the end of the manifold so that no part of the exhaust pipe needs to be water jacketed.

Having now described my invention and in what manner the same may be used, what I claim as new and desire to protect by Letters Patent is:

1. A water injector for an engine having an exhaust manifold, comprising an exhaust tube adapted for connection with an exhaust pipe, means on said tube for connection with said manifold, a water tube having a nozzle end directed upstream in relation to the direction of gas flow from said manifold, a water deflector adjacent said nozzle end and shielding said nozzle end from said gas flow, and a strut supporting said nozzle end and said deflector in axial positions with respect to said exhaust tube, said nozzle end of said water tube being positioned at the upstream end of said exhaust tube and said deflector being positioned beyond said upstream end so as to project into said manifold.

2. A water injector for an engine having an exhaust manifold, comprising an exhaust tube adapted for connection with an exhaust pipe, means on said tube for connection with said manifold, a water tube having a nozzle end directed upstream in relation to the direction of gas flow from said manifold, a water deflector adjacent said nozzle end and shielding said nozzle end from said gas flow, and a strut supporting said nozzle end and said deflector in axial positions with respect to said exhaust tube, said deflector having a concave conical water deflector surface and a convex conical upstream end presented to the gas flow.

3. An injector as defined in claim 2, said deflector having a diameter slightly larger than said water tube for said shielding of said nozzle end.

4. An injector as defined in claim 2, said water tube being of L-shape with a radial inlet end extending through the wall of said exhaust tube.

5. An injector as defined in claim 2, said connection means comprising a radial flange on the upstream end of said exhaust tube.

6. A water injector for an engine exhaust comprising an exhaust tube, a mounting flange on one end of said tube, a strut in said tube, an L-shaped water tube having a radial inlet end extending through the wall of said exhaust tube and an axial nozzle end mounted on said strut, and a conical deflector mounted in axial position on said strut adjacent said nozzle end, said nozzle end of said water tube being positioned approximately in the plane of said flange and said deflector projecting outward from said one end of said exhaust tube and said flange, said strut having a portion projecting axially beyond said one end of said exhaust tube supporting said deflector.

References Cited

UNITED STATES PATENTS

| | | | |
|---|---|---|---|
| 984,212 | 2/1911 | Gray | 60—30 |
| 1,076,571 | 10/1913 | Hall | 60—30 |
| 3,132,474 | 5/1964 | Fox | 60—30 |
| 3,263,413 | 8/1966 | Vactor | 60—30 |

CARLTON R. CROYLE, Primary Examiner

D. HART, Assistant Examiner

U.S. Cl. X.R.

60—31